(12) United States Patent
Warta et al.

(10) Patent No.: US 10,745,276 B2
(45) Date of Patent: Aug. 18, 2020

(54) TAIL GAS HEATING WITHIN PSA SURGE TANK

(71) Applicants: Andrew Warta, Wheatfield, NY (US); Bryan S Kalp, Grand Island, NY (US); Troy M Raybold, Colden, NY (US); Raymond F Dmevich, Clarence Center, NY (US)

(72) Inventors: Andrew Warta, Wheatfield, NY (US); Bryan S Kalp, Grand Island, NY (US); Troy M Raybold, Colden, NY (US); Raymond F Dmevich, Clarence Center, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 16/023,374

(22) Filed: Jun. 29, 2018

(65) Prior Publication Data
US 2020/0002166 A1 Jan. 2, 2020

(51) Int. Cl.
*C01B 3/56* (2006.01)
*B01D 53/047* (2006.01)
*C01B 3/48* (2006.01)

(52) U.S. Cl.
CPC ............ *C01B 3/56* (2013.01); *B01D 53/047* (2013.01); *C01B 3/48* (2013.01); *C01B 2203/0233* (2013.01); *C01B 2203/0283* (2013.01); *C01B 2203/043* (2013.01); *C01B 2203/0827* (2013.01); *C01B 2203/0833* (2013.01); *C01B 2203/0883* (2013.01)

(58) Field of Classification Search
CPC .............................. C01B 3/56; B01D 53/047
USPC ...................................................... 423/652
See application file for complete search history.

(56) References Cited

U.S. PATENT DOCUMENTS

| | | |
|---|---|---|
| 4,149,940 A | 4/1979 | Pinto |
| 6,607,006 B2 | 8/2003 | Smith et al. |
| 6,719,007 B2 | 4/2004 | Smith et al. |
| 7,037,485 B1 | 5/2006 | Drnevich et al. |
| 7,250,150 B1 * | 7/2007 | Keefer ................. B01D 53/047 252/373 |
| 7,252,693 B2 | 8/2007 | Rostrup-Nielsen et al. |
| 7,481,859 B2 | 1/2009 | Rostrup-Nielsen et al. |
| 8,187,363 B2 | 5/2012 | Grover |
| 2004/0013987 A1 * | 1/2004 | O'Rear ................. C10L 3/00 431/2 |
| 2005/0178063 A1 | 8/2005 | Reinke et al. |
| 2006/0231463 A1 | 10/2006 | Pham et al. |
| 2007/0051042 A1 | 3/2007 | Grover |
| 2008/0124255 A1 * | 5/2008 | Johnston ............. B01J 19/249 422/600 |
| 2009/0230359 A1 | 9/2009 | Guvelioglu et al. |
| 2009/0232729 A1 | 9/2009 | Genkin et al. |

(Continued)

FOREIGN PATENT DOCUMENTS

| EP | 1101731 A1 | 5/2001 |
|---|---|---|
| EP | 3138810 A1 | 3/2017 |

(Continued)

*Primary Examiner* — Douglas B Call
(74) *Attorney, Agent, or Firm* — Iurie A. Schwartz

(57) ABSTRACT

The present invention relates to a method of improving the efficiency of an integrated hydrogen generation system by the introduction of a means to heat the PSA tail gas within the PSA surge tank.

13 Claims, 1 Drawing Sheet

(56) References Cited

U.S. PATENT DOCUMENTS

| | | | |
|---|---|---|---|
| 2010/0011955 A1* | 1/2010 | Hufton | B01D 53/047 |
| | | | 95/136 |
| 2011/0011128 A1* | 1/2011 | Grover | B01D 53/047 |
| | | | 62/617 |
| 2011/0100214 A1* | 5/2011 | Grover | C01B 3/48 |
| | | | 95/99 |
| 2013/0025281 A1* | 1/2013 | Jiang | B01J 19/00 |
| | | | 60/722 |
| 2016/0002035 A1* | 1/2016 | Ralston | C01B 3/38 |
| | | | 252/373 |
| 2017/0158504 A1* | 6/2017 | Merritt, Jr. | C01B 3/56 |
| 2018/0022605 A1 | 1/2018 | Murata et al. | |

FOREIGN PATENT DOCUMENTS

| | | |
|---|---|---|
| EP | 3235784 A1 | 10/2017 |
| JP | 2015030655 A | 8/2013 |
| WO | 2012/096812 A1 | 1/2012 |

* cited by examiner

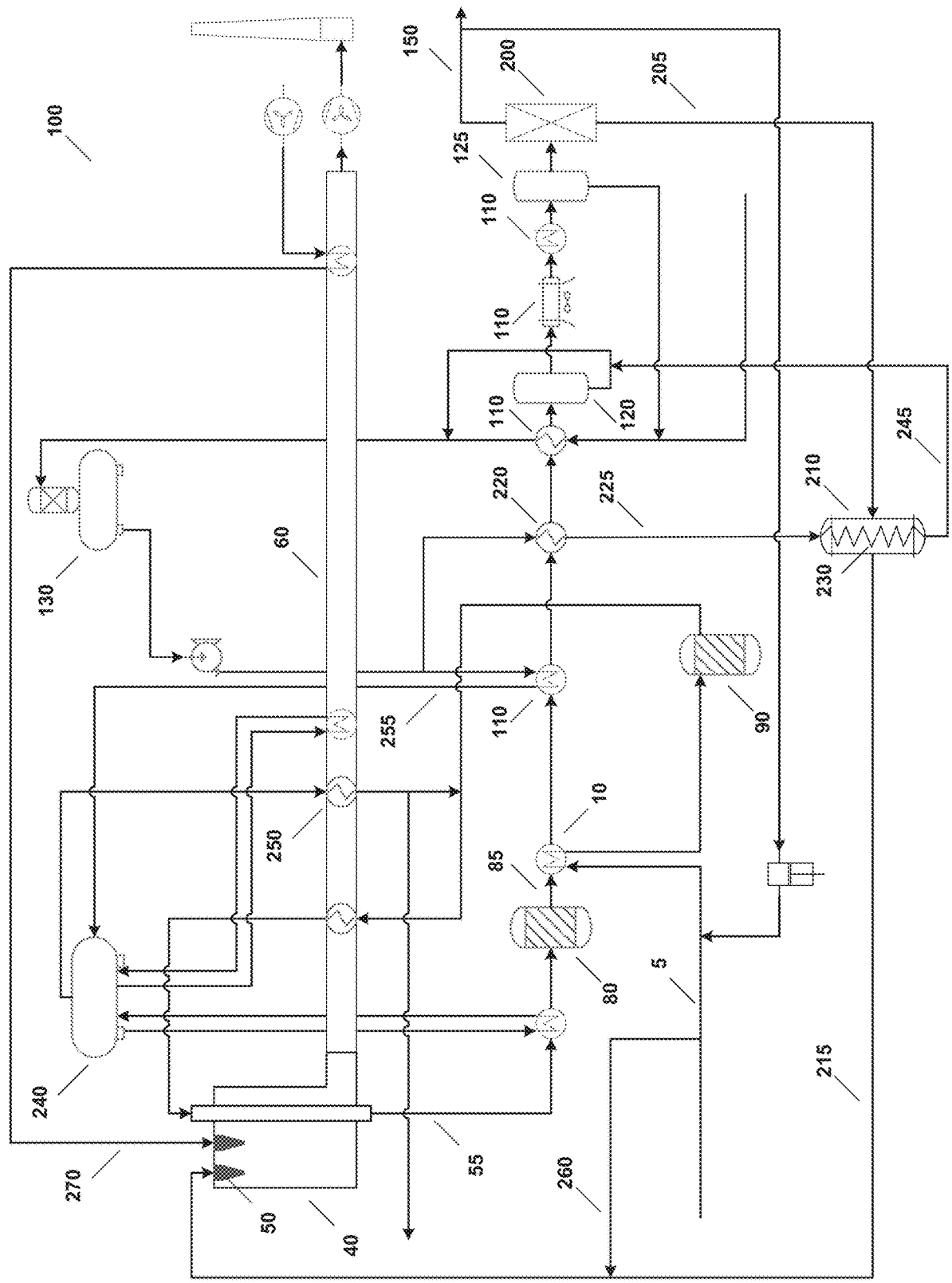

TAIL GAS HEATING WITHIN PSA SURGE TANK

FIELD OF INVENTION

The present invention relates to a method of improving the efficiency of an integrated hydrogen generation system by the introduction of a means to heat the PSA tail gas within the PSA surge tank.

BACKGROUND OF THE INVENTION

Steam methane reforming (SMR) processes are widely used in the industry to convert a feedstock (e.g., natural gas) into a syngas stream containing primarily hydrogen and carbon monoxide by undergoing a sequence of net endothermic reactions. Since the reforming reaction is endothermic, heat is supplied to the catalyst filled tubes located in the combustion section of the steam methane reformer by burners. Fuel for the burners comes from sources such as the pressure swing adsorption (PSA) unit in the form of purge gas, also known as tail gas. Some makeup fuel such as natural gas is also supplied to the burners. The following reactions take place inside the catalyst packed tubes:

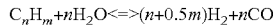
$$C_nH_m + nH_2O <=> (n+0.5m)H_2 + nCO$$

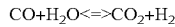
$$CO + H_2O <=> CO_2 + H_2$$

The crude synthesis gas product (i.e., syngas) from the reformer, which contains mainly hydrogen, carbon monoxide, carbon dioxide, and water, is further processed in downstream unit operations, such as the shift reactor and the PSA unit. An example of steam methane reformer operation is disclosed in Drnevich et al (U.S. Pat. No. 7,037,485), and incorporated by reference in its entirety.

Typically, the syngas, which is produced from the reformer at high temperature, must be cooled to near ambient temperature for purification in the downstream PSA unit, which separates the stream into nearly pure hydrogen product and tail gas. It is this tail gas stream from the PSA which is recycled to the reformer burners. The products of the burner combustion (flue gas) are also cooled to recover their heat. These cooling needs are achieved in part by preheating process streams and steam generation.

The amount of heat to be recovered exceeds that needed to operate the process, and not all remaining heat can be effectively recovered via steam generation. This wasted heat reduces overall plant efficiency. One large stream that is often not heated is the PSA tail gas due to the high capital cost and pressure drop associated with conventional stand-alone tail gas preheaters. If this stream could be heated cost effectively without additional pressure drop, the overall efficiency of the process would increase due to a corresponding decrease in required makeup fuel.

Heating PSA tail gas has been disclosed in prior art. See, e.g., U.S. Patent Application Publication Nos.: 2009/0230359 A1, 2005/0178063 A1, 2006/0231463 A1, 2007/0051042 A1, 2009/0232729 A1, and U.S. Pat. No. 4,149,940. However, these standalone shell and tube or plate type heat exchangers are typically large and expensive. Only minimal pressure can be tolerated in the low pressure PSA tail gas stream before hydrogen recovery in the PSA is impacted, decreasing overall plant efficiency. In the related art, such as for example, U.S. Pat. No. 8,187,363 to Grover addresses the possibility of heating the tail gas stream through the use of a plate type exchanger prior to introducing same into the combustion zone of the SMR. Such an exchanger will still introduce undesired pressure drop and require significant capital cost. Therefore, it is desirable to heat the PSA tail gas stream with a minimal decrease in its pressure, while minimizing the additional capital required.

Regarding the PSA tail gas surge tank, the related art has focused on increased mixing within the surge tank vessel, as shown in U.S. Pat. Nos. 6,607,006 B2 and 6,719,007 B2. The focus of the '006 patent is "amplitude attenuation of time-variant properties of fluid stream," which is the introduction of time variant streams into an enclosed volume to control the residence time distribution, with equations governing "flatness constraints" as shown in the document. The '007 patent also discusses "attenuating the amplitude", with a focus on the mixing zone containing an inlet and three or more outlets for three or more individual fluid portions. There is no mention of heating within the surge tank vessel.

To overcome the disadvantages of the related art, it is one of the objectives of the present invention to provide a method for increasing the temperature of PSA tail gas by incorporating heat exchange surface within the PSA tail gas surge tank. This allows for heating of the PSA tail gas without an additional heat exchanger introducing additional pressure drop between the PSA tail gas surge tank and the SMR combustion zone.

It is another object of the invention to increase the overall plant efficiency of a hydrogen generation system through a novel means of increasing the temperature of the PSA tail gas. This invention adds the means to heat the PSA tail gas within the existing PSA tail gas surge tank(s).

Other objects and aspects of the present invention will become apparent to one skilled in the art upon review of the specification, drawings and claims appended hereto.

SUMMARY OF THE INVENTION

This invention pertains to a method of improving the efficiency of an integrated hydrogen generation system. In one aspect of the invention, the method includes:
  producing a syngas stream in a steam reformer which has a combustion zone;
  introducing at least a portion of the syngas stream to a water gas shift reactor;
  cooling the shifted syngas stream to produce a cooled shifted syngas stream;
  introducing the cooled shifted syngas stream into a pressure swing adsorption unit, thereby producing a stream of predominantly hydrogen and a tail gas comprising predominantly byproducts;
  routing said tail gas to one or more surge tank(s) having a heat exchange device disposed therein and indirectly heating said tail gas by passing it over a surface of said heat exchange device inside which a hot fluid is cooled, thereby obtaining a heated tail gas; and
  routing said heated tail gas to the combustion zone of the reformer.

BRIEF DESCRIPTION OF THE DRAWINGS

The above and other aspects, features, and advantages of the present invention will be more apparent from the following drawing, wherein:

FIG. 1 is a schematic representation of a hydrogen generation system where the PSA tail gas is routed to a surge tank with internal indirect heating prior to recycling the tail gas to the SMR combustion zone.

DETAILED DESCRIPTION OF THE INVENTION

The method will be described with reference to FIG. 1, a hydrogen generation system 100 in which hot syngas 55—a mixture of hydrogen ($H_2$), carbon monoxide (CO), and undesired components (e.g., water, methane, etc.)—is produced from a steam reformer (SMR) 40. Syngas 55 is cooled and preferably routed to a water gas shift reactor 80 to further convert CO and water into $H_2$ and $CO_2$. This resulting syngas stream 85 is cooled to near ambient temperature (~100° F.) through a series of heat exchangers 110 and 220. The condensed water from the stream will be removed in knockout drums 120 and 125, and the stream is sent to a PSA unit 200.

The PSA is formed of a number of adsorbent beds depending on the size of the plant. The separation is achieved by driving the adsorption/desorption using various pressure levels. The purified hydrogen product is taken as stream 150 at a pressure of ~150-500 psig, while the remaining components will be taken as tail gas stream 205 at ~5 psig. The lower this tail gas discharge pressure, the better the $H_2$ recovery achieved by the PSA, and thus the better the overall plant efficiency. The discharge pressure is largely set by the pressure required to get the tail gas 215 to the burners 50 in the combustion zone of the SMR 40, where it is used as fuel. For a typical large SMR, this tail gas fuel line could be hundreds of feet long, including going from near ground level to ~50 feet of elevation to reach the burners. Large diameter pipe is used to minimize the pressure drop across this distance.

Due to the cyclical nature of the PSA process, the tail gas stream is not generated at a constant flow rate or composition. The tail gas stream 205 is sent to one or more surge tanks 210, which allows for the tail gas from the various PSA beds to be well mixed, maintaining a tail gas composition with a variation in Wobbe index and flow, of +/−5%. The Wobbe index is a typical measure of the combustion energy of the gas and takes into account the heating value and specific gravity of the gas. Within the surge tank(s) of the current invention is/are the means to heat the tail gas through a heating surface 230, such as a coil or a heat exchanger, which indirectly increases the temperature of the tail gas by cooling a hot fluid. The resulting tail gas temperatures are typically between 150 and 500° F., or greater, depending on the source and temperature of the hot fluid used. By integrating the preheating of the tail gas stream into the PSA surge tank, and thereby eliminating the need for standalone tail gas preheaters downstream of surge tank 210, the pressure drop remains low.

In a preferred embodiment, the means to heat the tail gas will be through indirect heat exchange, more preferably achieved through heat exchange coils arranged within the PSA surge tank. The tail gas within the surge tank will flow across the outside of the coils, with a higher temperature fluid flowing within the coils. The source of the higher temperature fluid is preferably generated within the hydrogen generation system. For instance, the fluid may be a saturated low pressure steam stream 225 routed from a low pressure steam generator 220 at a temperature between 250 and 350° F. Alternately, the higher temperature fluid can be a saturated high pressure steam stream generated from a steam drum 240 at a temperature between 350 and 500° F. Alternately, superheated high pressure steam routed from a steam superheater 250 at a temperature between 500 and 800° F. may be utilized. Alternately, a portion of a heated water stream like demineralized water or boiler feed water 255 may be utilized. Alternately, a syngas stream coming from one of the heat exchangers 110 may be utilized. Other streams or combinations of streams obvious to one skilled in the art may additionally be utilized.

In an alternative embodiment, the source of the higher temperature fluid may be supplied from a source external to the hydrogen generation system. For instance, hot fluids from nearby refining or chemical manufacturing facilities may be utilized. These imported streams may for example be, but are not limited to, a saturated low or high pressure steam stream, a superheated low or high pressure steam stream, heated process or waste gas, or heated water.

The higher temperature fluid will typically enter near the top of the PSA surge tank and flow downwards, allowing any condensed liquid to flow downward, assisted by gravity. In the preferred embodiment, the cooled/condensed steam stream 245 is mixed with process condensate from a knockout drum 120 and recycled and sent to a deaerator 130. In addition to the heating coils 230, the surge tank 210 can also contain conventional means to increase internal mixing of the tail gas, such as baffles.

The warmed tail gas stream 215 is mixed with makeup fuel (e.g. natural gas 260) and air 270, before being combusted via burners 50 in the combustion zone of the reformer 40. The combustion products (i.e., flue gas) are cooled in a convection section 60 of the SMR to ~300° F. and vented. The cooling of the syngas and flue gas are achieved by warming other process streams within the hydrogen generation system with heat exchangers, including heating the reformer feed, demineralized water, boiler feed water, and combustion air, boiling water for steam generation, heating the steam, and feed/steam mixture.

The required makeup fuel for the combustion is lower than would be required if the tail gas were not heated resulting in operational savings. Due to the avoidance of any standalone tail gas preheater between surge tank 210 and burners 50, the pressure drop in stream 215 is lower, meaning the pressure of the tail gas stream 205 is lower, increasing $H_2$ recovery of PSA 200.

The hydrogen generation system may additionally contain other options known to one skilled in the art, including but not limited to other reactors, such as pre-reformers, and various types of water gas shift (high temperature, medium temperature, and/or low temperature). Multiple pressures of steam may be produced, including high pressure steam for export, process steam for the reforming and water gas shift reactions, and low pressure steam for use within the plant. Slipstreams of syngas 55 could be cooled and taken as product directly or could be purified to generate byproduct CO.

EXAMPLE

This example illustrates the reduction in pressure drop for the tail gas stream through the use of a coil-type heat exchange arrangement within a tail gas surge tank compared to a standalone tail gas preheater. Total hydrogen plant process simulations and heat exchanger sizing were carried out, achieving the same overall production efficiency improvement for the process compared to a process without any tail gas preheating, as shown in Table 1, below.

TABLE 1

| Case | TG Temperature [° F.] | TG Pressure Drop After Surge Tank [psi] | Efficiency Improvement [BTU/SCF $H_2$] |
|---|---|---|---|
| No TG PH | 110 | 0 | — |
| Standalone TG PH (Comparative Example) | 224 | 0.15-0.25 | 2 |
| Integrated TG PH within TG Surge Tank | 224 | 0 | 2 |

For a process producing 100 MMSCFD of hydrogen, syngas is generated in a natural gas fed SMR furnace, with further conversion of CO to hydrogen achieved in a high temperature shift (HTS) reactor. The resulting syngas stream is cooled in a series of heat exchangers, and condensed water removed in knock out drums. One of the heat exchangers which cools the syngas produces saturated 30 psig steam from boiler feed water. The cooled syngas stream enters a 12-bed hydrogen PSA at 110° F. and is separated into 300 psig product purity hydrogen and 5 psig tail gas. The tail gas from each of the 12 beds is passed to a tail gas surge tank at an average combined flow rate of 5560 lbmole/hr where it is well mixed and heated by tail gas preheating coils integrated within the tail gas surge tank. This tail gas preheater has saturated 30 psig steam at a flow rate of 320 lbmole/hr condensing on the inside of the coils, heating the tail gas flowing on the outside of the coils.

The saturated 30 psig steam, with a temperature of ~274° F. flows downward through the coil as it condenses. The tail flows across the coils as it is heated. The tail gas is heated to a temperature of ~224° F. and withdrawn from the tail gas surge tank with a nearly constant flow, pressure, and temperature. Heating the tail gas from 110° F. to 224° F. reduces the required makeup fuel flow by 4.6% and results in an overall process efficiency improvement of 2 BTU/SCF of hydrogen produced on a feed, fuel, and steam production basis, compared to a similar process with no tail gas preheating.

Comparative Example

For a 100 MMSCFD hydrogen generation system using conventional technology of a standalone tail gas preheater located downstream of the tail gas surge tank, the tail gas is heated by saturated 30 psig steam. To produce the same tail gas heating from 110° F. to 224° F., the added pressure drop from this 29 ton standalone tail gas preheater is typically between 0.15 and 0.25 psi.

Although various embodiments have been shown and described, the present disclosure is not so limited and will be understood to include all such modifications and variations as would be apparent to one skilled in the art.

We claim:

1. A method of improving the efficiency of an integrated hydrogen generation system comprising:
   producing a syngas stream in a steam reformer which has a combustion zone;
   introducing at least a portion of the syngas stream to a water gas shift reactor;
   cooling the shifted syngas stream to produce a cooled shifted syngas stream;
   introducing the cooled shifted syngas stream into a pressure swing adsorption unit, thereby producing a stream of predominantly hydrogen and a tail gas comprising predominantly byproducts;
   routing said tail gas to one or more surge tank(s) having a heat exchange device disposed therein and indirectly heating said tail gas by passing it over a surface of said heat exchange device inside which a hot fluid is cooled, thereby obtaining a heated tail gas; and
   routing said heated tail gas to the combustion zone of a reformer.

2. The method of claim 1, wherein a heated tail gas temperature ranges from about 150 to 500° F.

3. The method of claim 1, wherein the heat exchange device is a coil, or a heat exchanger.

4. The method of claim 1, wherein the hot fluid flowing through the heat exchange device disposed in the surge tank is a saturated or superheated low pressure steam stream from 225 to 400° F.

5. The method of claim 1, wherein the hot fluid flowing through the heat exchange device disposed in the surge tank is a saturated or superheated high pressure steam stream from 350 to 800° F.

6. The method of claim 1, wherein the hot fluid flowing through the heat exchange device disposed in the surge tank is heated water.

7. The method of claim 1, wherein the hot fluid flowing through the heat exchange device disposed in the surge tank is syngas generated in the steam reformer.

8. The method of claim 1, wherein the hot fluid flowing through the heat exchange device disposed in the surge tank is imported from outside of a hydrogen generation system.

9. The method of claim 1, further comprising mixing the tail gas inside the surge tank to obtain a near homogeneous mixing with a Wobbe index variation of +/−5%.

10. The method of claim 1, wherein the cooled shifted syngas stream is routed to the pressure swing adsorption unit at pressure ranging from 150 to 500 psig.

11. The method of claim 1, wherein the heated tail gas routed to the combustion zone of the reformer is withdrawn from the surge tank at a pressure of between 1 and 50 psig.

12. The method of claim 11, wherein the heated tail gas routed to the combustion zone of the reformer is withdrawn from the surge tank at a pressure of between 2 and 7 psig.

13. The method of claim 1, wherein the tail gas comprises methane, water and other impurities.

* * * * *